US012714924B1

(12) United States Patent
Reimers et al.

(10) Patent No.: US 12,714,924 B1
(45) **Date of Patent: *Aug. 25, 2026**

(54) RIDEABLE CYCLE

(71) Applicant: Eric W. Reimers, Missoula, MT (US)

(72) Inventors: Eric W. Reimers, Missoula, MT (US); Michael J. Deden, Missoula, MT (US); Dale H. Truett, Missoula, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,672

(22) Filed: Mar. 18, 2024

Related U.S. Application Data

(63) Continuation of application No. 17/838,341, filed on Jun. 13, 2022, now Pat. No. 11,931,633, which is a continuation of application No. 16/423,080, filed on May 27, 2019, now Pat. No. 11,358,042.

(60) Provisional application No. 62/677,315, filed on May 29, 2018, provisional application No. 62/677,332, filed on May 29, 2018.

(51) Int. Cl.

| | |
|---|---|
| ***A63B 55/60*** | (2015.01) |
| ***B60R 3/00*** | (2006.01) |
| ***B60R 9/08*** | (2006.01) |
| ***B60R 25/04*** | (2013.01) |
| ***B60R 25/20*** | (2013.01) |
| ***B62H 5/08*** | (2006.01) |
| ***B62J 11/00*** | (2020.01) |
| ***B62J 17/08*** | (2020.01) |
| ***B62J 99/00*** | (2020.01) |
| ***B62K 11/02*** | (2006.01) |
| ***B62K 11/14*** | (2006.01) |
| ***B62K 19/46*** | (2006.01) |
| *B62J 50/20* | (2020.01) |

(52) U.S. Cl.
CPC ............. *A63B 55/61* (2015.10); *B60R 3/002* (2013.01); *B60R 9/08* (2013.01); *B60R 25/04* (2013.01); *B60R 25/20* (2013.01); *B62H 5/08* (2013.01); *B62J 11/00* (2013.01); *B62J 17/08* (2013.01); *B62J 99/00* (2013.01); *B62K 11/02* (2013.01); *B62K 11/14* (2013.01); *B62K 19/46* (2013.01); *A63B 2055/601* (2015.10); *A63B 2055/602* (2015.10); *A63B 2210/50* (2013.01); *B62J 50/20* (2020.02); *B62K 2204/00* (2013.01)

(58) Field of Classification Search
CPC ... A63B 55/60; A63B 55/61; A63B 2055/601; A63B 2055/602; B60R 9/08; B62D 61/02
See application file for complete search history.

(56) References Cited

U.S. PATENT DOCUMENTS

| | | | |
|---|---|---|---|
| 2,614,477 | A | 10/1952 | Habenicht |
| 2,908,510 | A | 10/1959 | Lossau |
| 3,247,923 | A | 4/1966 | Cornell |
| 3,605,929 | A | 9/1971 | Rolland |
| 3,648,795 | A | 3/1972 | Moulton |
| 3,777,836 | A | 12/1973 | Riza |
| 3,979,136 | A | 9/1976 | Lassiere |
| 4,874,055 | A | 10/1989 | Beer |
| 5,265,695 | A | 11/1993 | Piazzi |
| 5,277,267 | A | 1/1994 | Tiffany |

(Continued)

*Primary Examiner* — Valentin Neacsu
*Assistant Examiner* — Michael R Stabley
(74) *Attorney, Agent, or Firm* — Dawsey Co., LPA; David J. Dawsey

(57) ABSTRACT

A rideable cycle adapted to transport a rider. The cycle includes a frame and a seat, a front wheel and steering components, a rear wheel, and a motor/control subassembly.

20 Claims, 8 Drawing Sheets

(56) References Cited

U.S. PATENT DOCUMENTS

| | | | | |
|---|---|---|---|---|
| 5,328,193 | A | | 7/1994 | Shiew |
| 5,697,464 | A | * | 12/1997 | Gojak ..................... B62M 6/60 180/209 |
| 5,697,467 | A | | 12/1997 | Gojack |
| 5,899,284 | A | | 5/1999 | Reimers |
| 6,139,032 | A | | 10/2000 | Hartman |
| 6,659,208 | B2 | | 12/2003 | Gaffney |
| 7,086,491 | B2 | | 8/2006 | Matte |
| 7,537,076 | B2 | | 5/2009 | Falkiner |
| 7,631,715 | B2 | | 12/2009 | Falkiner |
| 7,690,390 | B2 | | 4/2010 | Hopkins |
| 8,091,749 | B2 | | 1/2012 | Stautzenberger |
| 8,308,178 | B2 | | 11/2012 | Hoerdum |
| 8,365,850 | B2 | | 2/2013 | Gal |
| 8,490,732 | B2 | | 7/2013 | Sugimoto |
| D745,843 | S | | 12/2015 | Wuttig |
| 9,199,147 | B2 | | 12/2015 | Azizi |
| 9,339,431 | B2 | | 5/2016 | Menard |
| 9,550,540 | B1 | | 1/2017 | Wang |
| 10,016,666 | B2 | | 7/2018 | Reimers |
| 10,179,624 | B1 | | 1/2019 | ODonnell |
| 10,189,529 | B1 | | 1/2019 | Wang |
| 11,260,935 | B2 | | 3/2022 | Reimers |
| 11,358,042 | B2 | | 6/2022 | Reimers |
| 2008/0023236 | A1 | | 1/2008 | Falkiner |
| 2010/0206652 | A1 | | 8/2010 | Kielland |
| 2016/0052464 | A1 | | 2/2016 | Wadey |
| 2017/0254137 | A1 | | 9/2017 | Peck |
| 2017/0327084 | A1 | | 11/2017 | Park |
| 2018/0022411 | A1 | | 1/2018 | Kistemaker |
| 2018/0056152 | A1 | | 3/2018 | Reimers |

* cited by examiner

RIDEABLE CYCLE

This application is a continuation of U.S. patent application Ser. No. 17/838,341, filed on Jun. 13, 2022, which is a continuation of U.S. patent application Ser. No. 16/423,080, filed on May 27, 2019, now U.S. Pat. No. 11,358,042, which is a non-provisional application, claiming priority from U.S. provisional applications Nos. 62/677,315 and 62/677,332 by the same inventors, filed 29 May 2018.

TECHNICAL FIELD

The present invention relates generally to accessories for golfers and particularly to personal powered golf bag carts and methods for transporting golf bags and the golfer.

BACKGROUND ART

Although the purists in the golf community insist that the only way to properly play golf is to carry the golf bag, either personally or through the use of a caddy, many golfers prefer to use carts to transport the golf bags and associated equipment. While riding carts are required by many courses, a great number of players desire to gain at least some of the exercise benefits of more compact and efficient means of transporting themselves and their equipment during the round while avoiding the often higher costs of renting a multiplayer cart from the course. For this reason walking carts are popular, but a rideable personal cart would be even better for those who wish or need to limit their exertions.

For many years pull carts, usually two-wheeled, were the norm. However, powered options, such as electric bag carts are fairly popular and gyroscopic two wheeled units with room for a rider and bag have been introduced.

Nonetheless, demand continues for more compact, more stable, more convenient and lighter golf bag carts, particularly personal rideable powered carts.

DISCLOSURE OF INVENTION

Accordingly, it is an object of the present invention to provide a powered rideable golf bag cart for transporting a golf bag and rider in a highly stable manner.

Another object of the invention is to provide a rideable personal golf cart which does not cause meaningful damage to fairways and other "through the green" areas of golf courses.

A further object of the present invention is to provide a rideable cart system with convenient support of the golf bag between the legs of the rider.

Yet another object of the invention is to provide a rideable powered cart which has a minimal footprint.

Another object of the invention is to rideable powered golf cart which is steerable by the rider and has sufficient power to negotiate most golf course terrain.

Still another object of one alternate embodiment of the invention is to provide shade and some rain protection to the rider.

A further object of one embodiment of the present invention is to provide a single passenger riding golf bag cart which is adapted to partially collapse to a storage mode for transport or storage.

Briefly, one preferred embodiment of the present invention is a personal rideable golf cart/cycle having the general shape of a two wheeled cycle. The cart/cycle is generally symmetrical about a longitudinal plane and includes a plurality of compatible subassemblies, each providing important functions to the whole. The subassemblies (each also designated as an "sba") include: a cycle frame subassembly; a personal support subassembly; a front wheel/steering subassembly; a rear wheel subassembly; a bag support subassembly; and a motive/control subassembly. The user rides, steers, and controls the speed from a seat above approximately the front of the rear wheel. The golf bag and its contents golf bag are supported at an angle between the golfer's legs, which extend downward to running boards (foot support plates) on either side of the frame. An electrical motor is powered by a battery mounted on the frame and is controlled by control elements mounted on the steering unit. Portions of the personal, bag support, and steering subassemblies are collapsible for convenient transport and storage.

Another equally preferred embodiment includes, in addition to the above features, a removable overhead canopy extending from the steering/handle to above the rider's head and a console for carrying various accessories situated above the upper bag cradle and the golf bag.

An advantage of the present invention is that it provides a simple, relatively lightweight, and comfortable single user powered riding golf cart.

Another advantage of the invention is that it is bilaterally symmetrical and relatively thin such that multiple units may be parked in a smaller space than conventional riding carts.

Yet another advantage of the present invention is that the cycle structure provides a familiar and comfortable means of transport for the golfer and equipment around the golf course. Still another advantage of the present invention is that it may be considered by many courses to be usable on the course, rather than restricted to cart paths, thus drastically aiding the comfort of the golfer and reducing the time taken to play a round of golf.

Another advantage of the present invention is that the partially collapsible aspects make it convenient for storage at a golf course and home and also for transport between locations.

A still further advantage of the present rideable golf bag cart/cycle invention is that no straps or similar restraints are necessary to keep the golf bag in place and provide easy access to the clubs during use.

Yet another advantage of the present invention is that the open frame of the bag support subassembly permits easy access to the pockets of the golf bag, so that the golfer may store and retrieve golf balls and accessories.

Another advantage of the present invention is that it provides the "feel" of a walking round, without the wear and tear on the golfer's body.

An additional advantage of the present invention is that the golf bag is maintained along the centerline (longitudinal plane) so as to avoid disruption of the balance during use and steering.

Another advantage of the present advantage of the present invention is that the incline of the golf bag (between twenty and forty-five degrees) maintains the clubs in a stable and easily accessible orientation.

A further advantage of the invention is that it is economical to use as a rental unit by the golf course.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
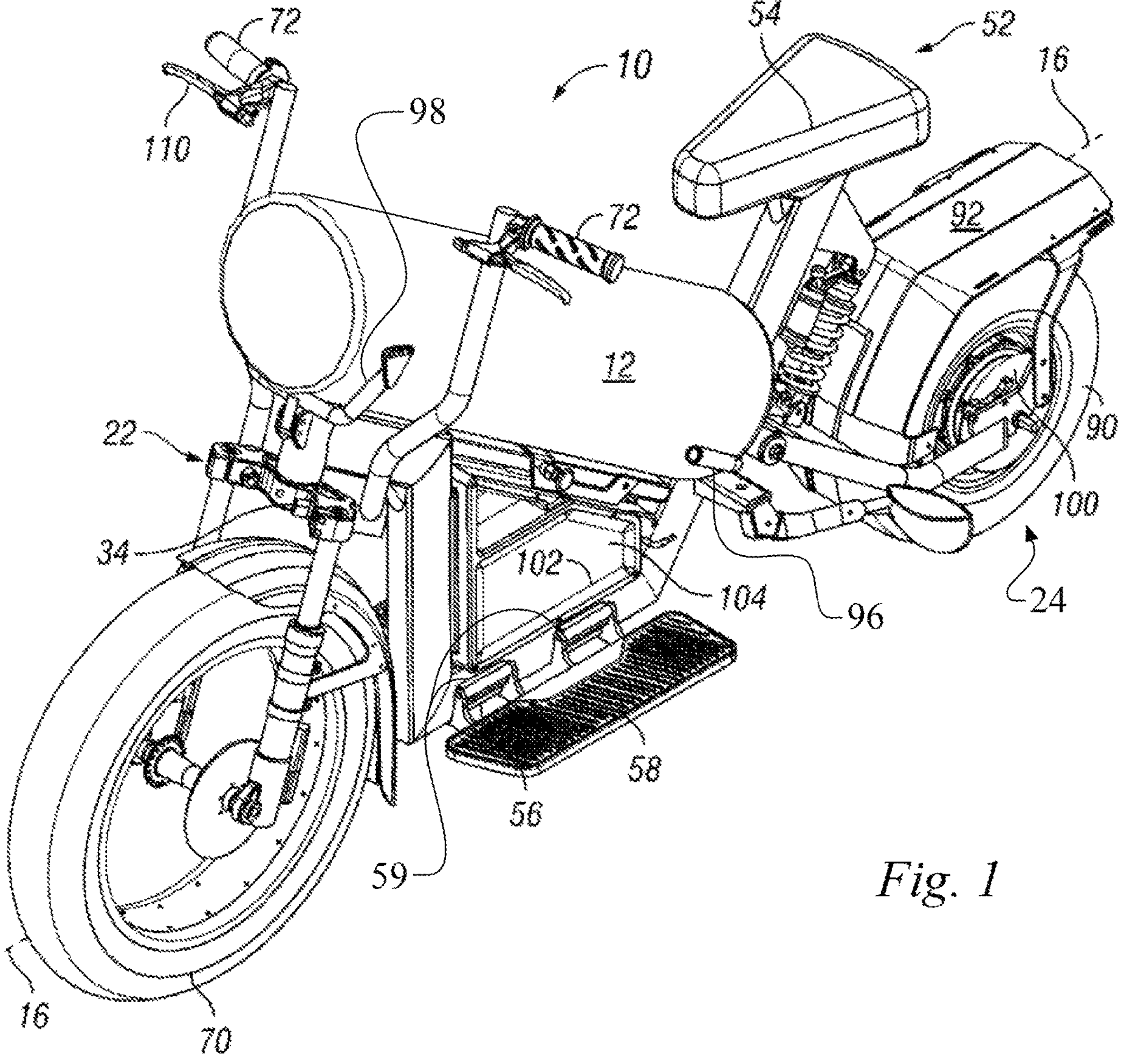
FIG. 1 is a front left perspective view of the powered riding golf bag cart/cycle of the present invention, illustrating a golf bag carried thereon.

The present invention is a personal rideable golf bag cart in the form of a riding cycle used to transport the user along with golf bags loaded with golf clubs and accessories. The rideable golf bag cart/cycle is referred to by the general reference character 10 in the drawings and description. The rideable cart 10 may be used with various golf bags and may exist in multiple embodiments.

Figures 5, 6:
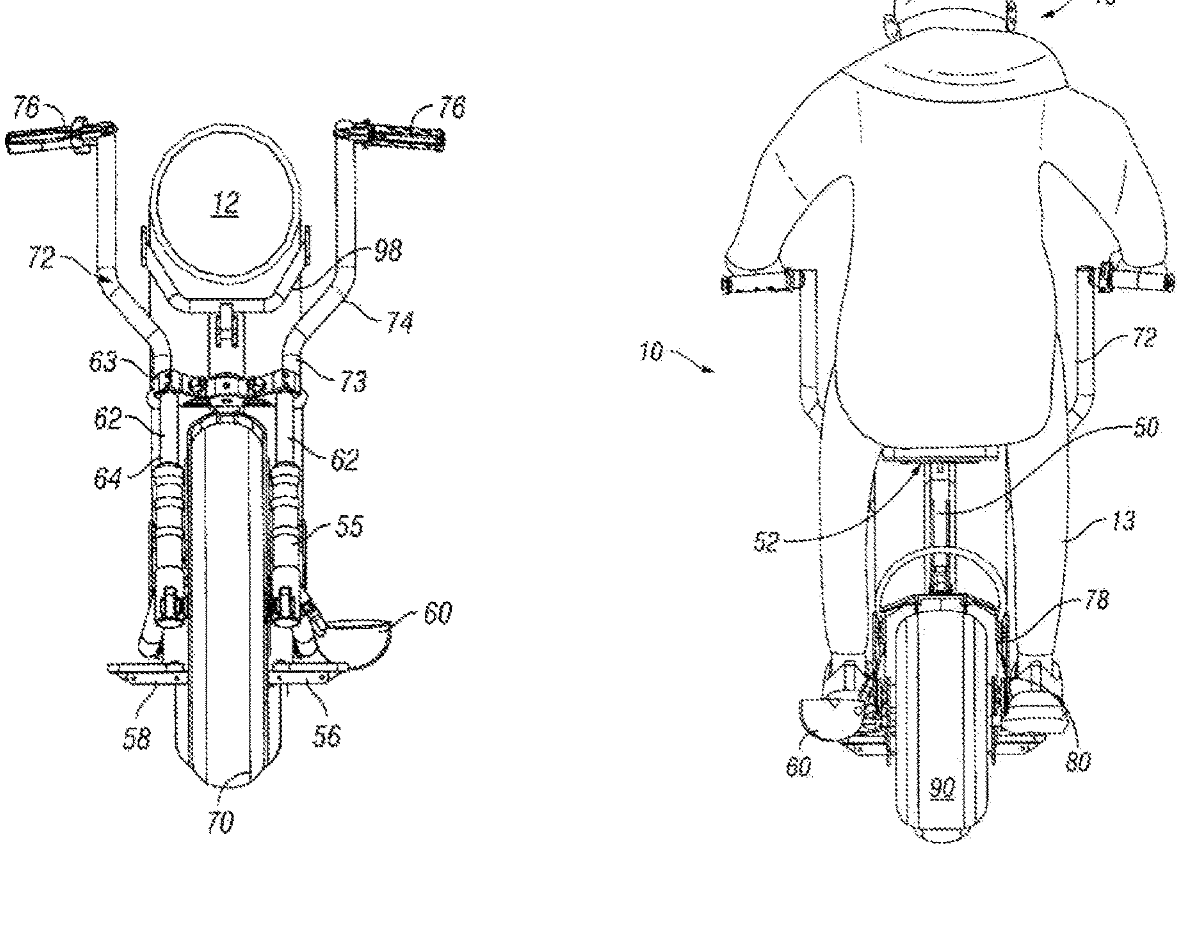
FIG. 5 a front elevational view of the presently preferred embodiment of the invention.
FIG. 6. is a rear elevational view of the riding golf bag cart/cycle of the present invention, showing a rider in phantom.
Figure 7:
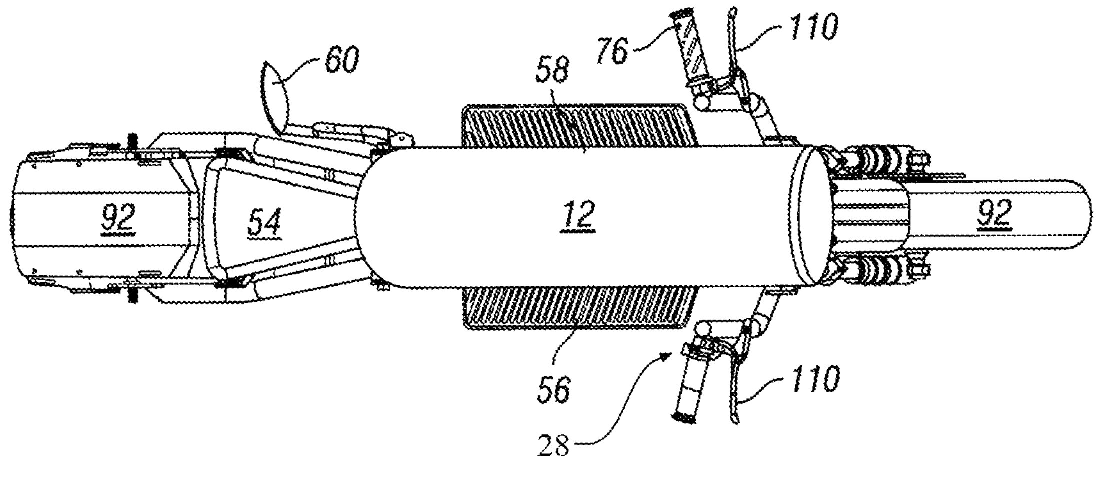
FIG. 7. is a top view of the invention, shown without a golf bag.
Figure 8:
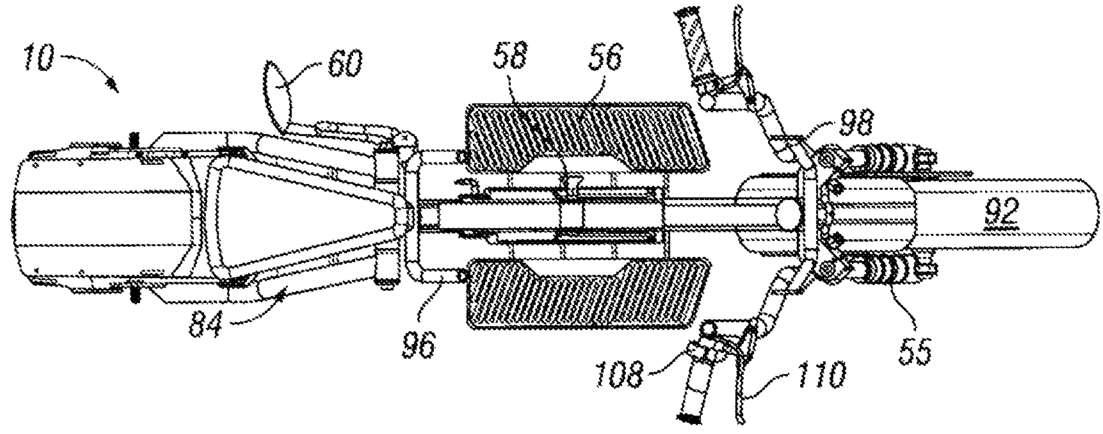
FIG. 8 is a bottom view of the preferred embodiment.

In one preferred embodiment of the invention illustrated in FIGS. 1, the rideable cart 10 is shown in a perspective view as appropriate for transporting a typical golf bag 12 as well as a golfer/rider 13 (shown in phantom in FIG. 6). The cart/cycle 10 is generally symmetrical about a vertical (in normal operation) longitudinal plane 16.

The cart/cycle 10 may be thought of as having various principal assemblies or subassemblies (each sometimes referred to in shorthand as a “sba” herein) which operate together in order to function as an easy to use method of transporting a golf bag 12 and rider 13 on the rolling surfaces of a golf course and in other locations such as parking lots and storage facilities. The cart/cycle 10 is not ordinarily intended for use on public roads. The primary subassemblies include: a cycle/frame subassembly (sba) 18; a personal support sba 20; a front wheel and steering sba 22, a rear wheel sba 24, a bag support sba 26, and a motive sba 28. It is understood that some components of the invention interface with others and may be considered to be a part of more than one of the subassemblies. As discussed further below, some of the sbas have structures which allow them to be physically manipulated to create a collapsed/storage mode 30 having a lower and narrower aspect for transport and storage.

The cycle/frame subassembly 18 includes a convoluted frame tube 32, aligned within the vertical longitudinal plane 16, which mates together with a steering bracket 34 at the front of the cycle frame 18 to form a connection with the front wheel/steering sba 22. The frame tube 32 includes a number of component segments 36 extending continuously rearward from the steering bracket 34. The segments 36 are, from the front: a front angle segment 38 extending outward, rearward, and downward; an elongated down segment 40, extending nearly vertically downward; a base segment 42 extending at a right angle (horizontally) to the down segment 40 and extending to the rear wheel sba 24; a rear segment 44 extending upward and rearward at about a forty five degree angle from the base segment 40; and an incline segment 46 extending forward and upward to connect with the upper portions of the personal support sba 20. A shock absorber bracket 50 extends rearward and downward from the upper portion of the rear segment 44 to provide an anchor for mating with the rear wheel sba 24.

The personal support sba 20 is an adjunct to the cycle frame sba 18. The personal support sba 20 includes a seat 52 having a cushion 54. The seat 50 is mounted on and above the incline segment 46. A shock absorber 55 extends from the shock absorber bracket 50 to connect with the rear wheel sba 24 to add comfort. The seat 52 and cushion 54 provide support for the golfer/rider 13 during use.

The personal support sba further includes a pair of includes a pair of running boards 56 pivotally attached on opposing sides of the base segment 42 in order to provide rest for the golfer's feet during use and to aid in mounting the cart/cycle 10. The running boards 56 are attached by a pair of board extensions 58 attached to the bottom of the base segment 42 near the midpoint thereof to extend outward. The board extensions 58 engage a pivot rod 59, upon which the running boards 56 can be rotated to an up position for compact use in the collapsed mode 30 or a down position for use while riding or mounting. A kickstand 60 is also provided on at least one side to prevent the cart/cycle 10 from tipping over when at rest.

The front wheel/steering subassembly 22 includes a front fork 62 pivotally mounted to depend from the steering bracket 34. The front fork 62 includes a fork bracket 63 pivotally connected to the steering bracket 34 and supports a pair of opposed fork arms 64 depending therefrom, each including a shock absorber 55. The fork arms 64 support a front wheel 66 on a front axle 68 extending between the lower extents of the opposing fork arms 64. The front wheel 66 has a substantial diameter and supports a front tire 70 having a moderately wide tread for traction while being pneumatic and relatively soft so as to avoid damaging the turf in use.

Figure 9:
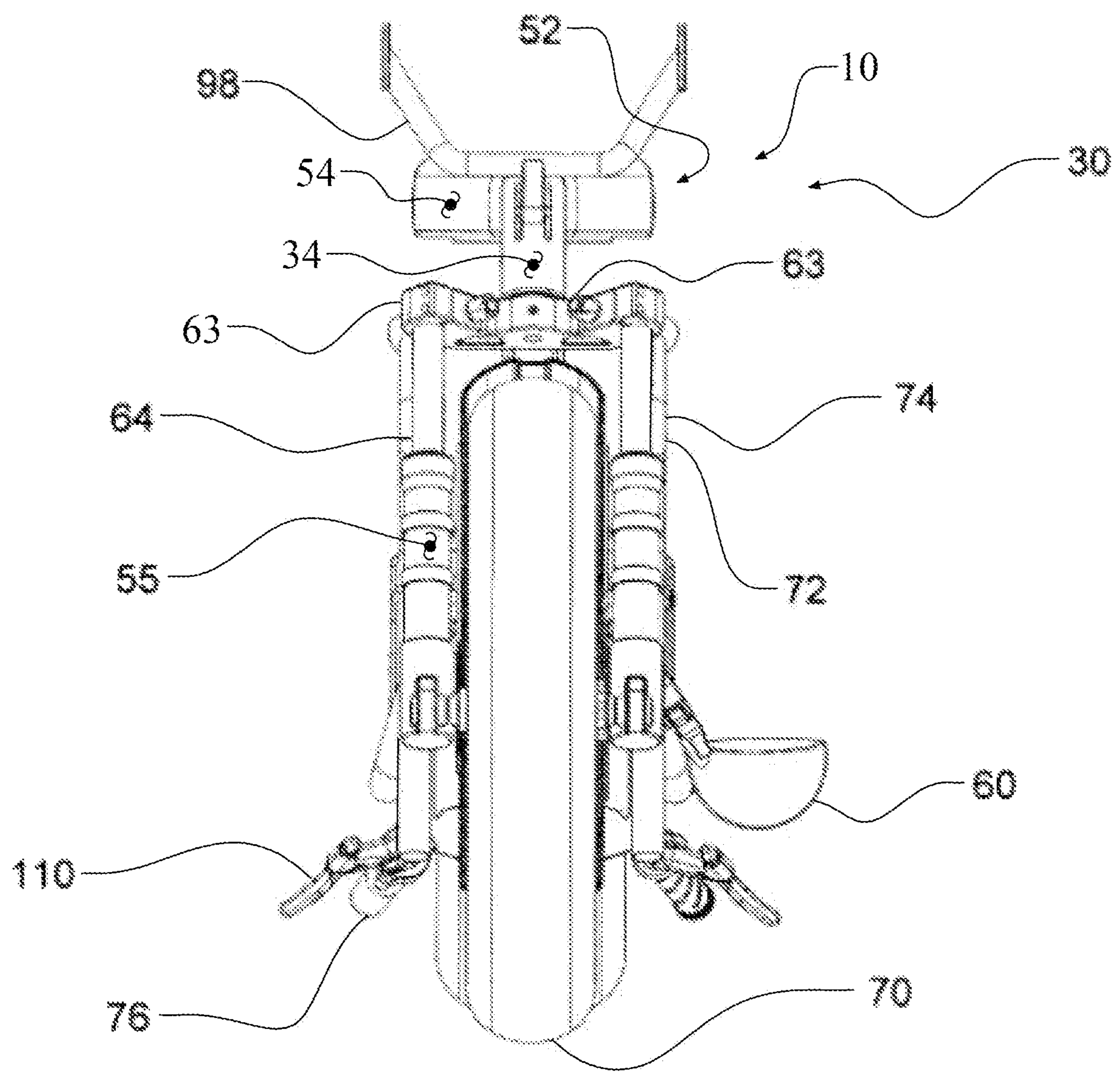
FIG. 9 is a front elevational view, showing the collapsed mode of the invention.

In the preferred embodiments 10 and 118 (FIGS. 10 and 11) the upper portion of the front wheel/steering sba 22 includes a set of handlebars 72 pivotally attached to the fork bracket 63 by pivot tubes 73 on either side. Each handlebar 72 is bent outwards to form a curved tube 74 pivotally extending above the respective pivot tube 73 in order to facilitate steering and turning without impacting the golf bag 12 which extends therebetween. The curved tube 74 extends upward to handle grips 76 for comfortable hand positioning and steering. The pivotal attachment of the handlebars 72 to the fork bracket 63 allows the handlebars 72 to pivot downward around the front 70 tire in the compact storage more 30 (see FIG. 9). The curved tube 74 may also be rotated on the pivot tube 73 such that the handle grips 76 are aligned to be generally parallel with the front tire 70, thus minimizing net width in the collapsed storage mode 30.

Figure 2:
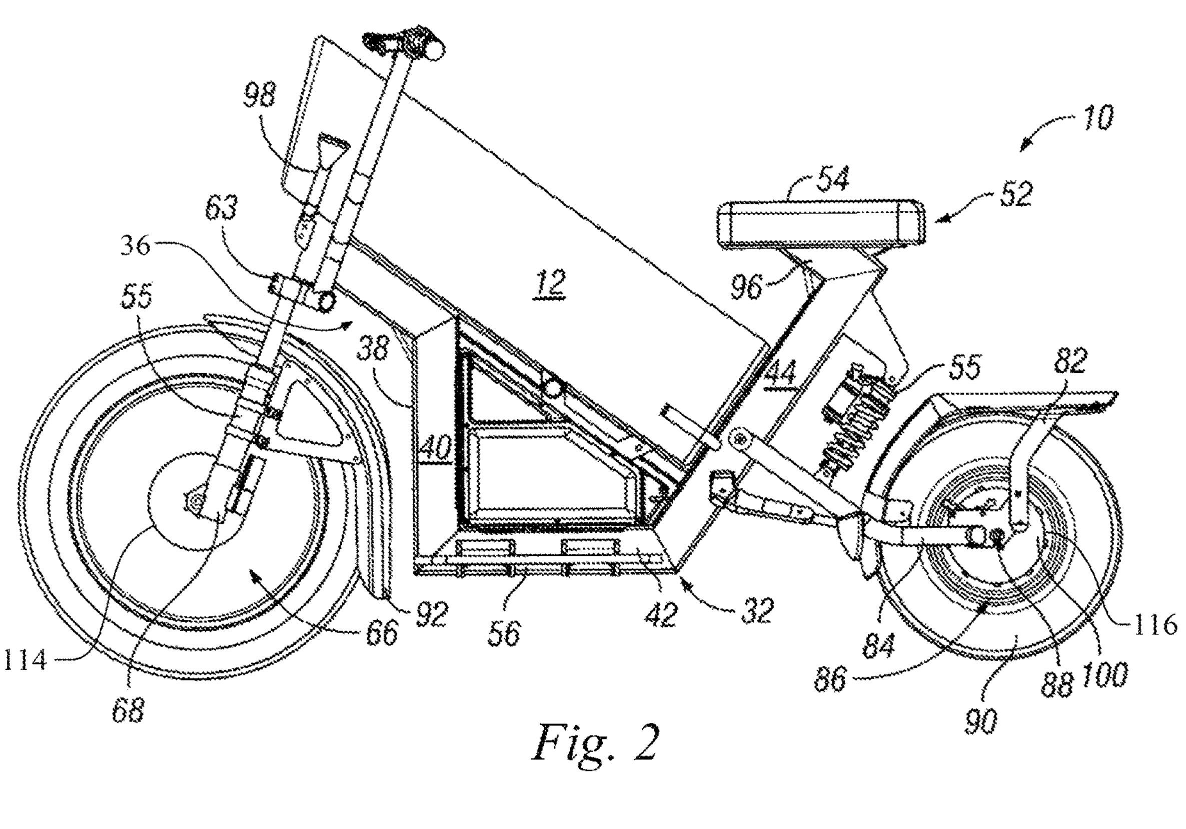
FIG. 2. is a left elevational view of the riding golf bag cart/cycle of the present invention, showing the golf bag.
Figure 3:
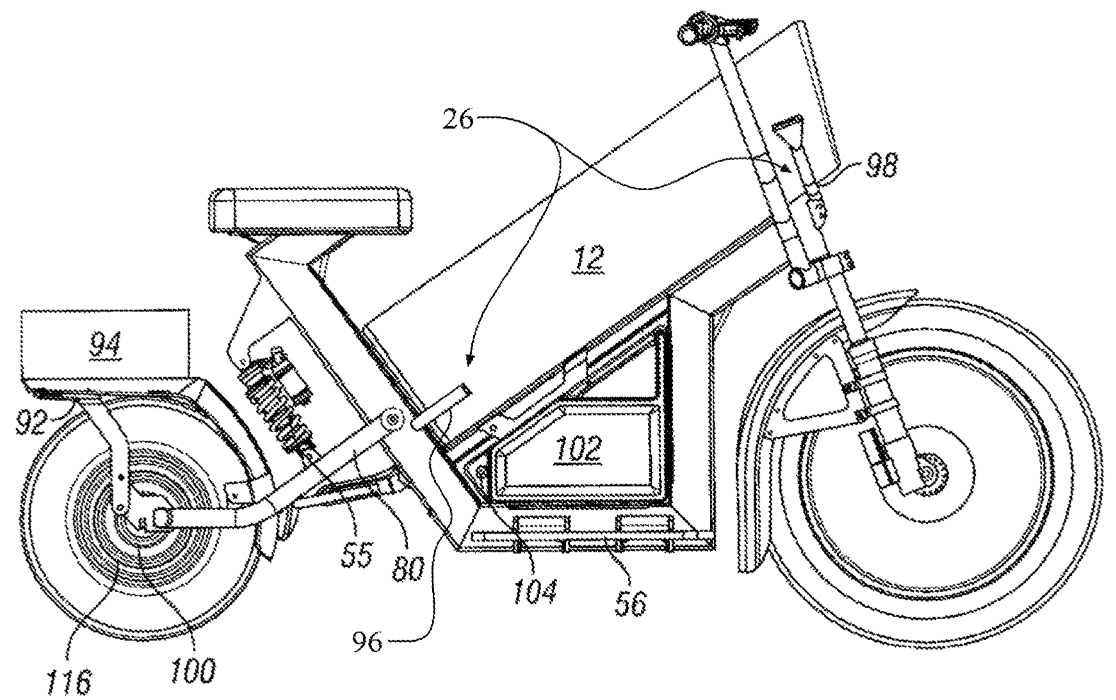
FIG. 3 a right elevational view of the riding golf bag cart/cycle of the present invention showing the golf bag.
Figure 4:
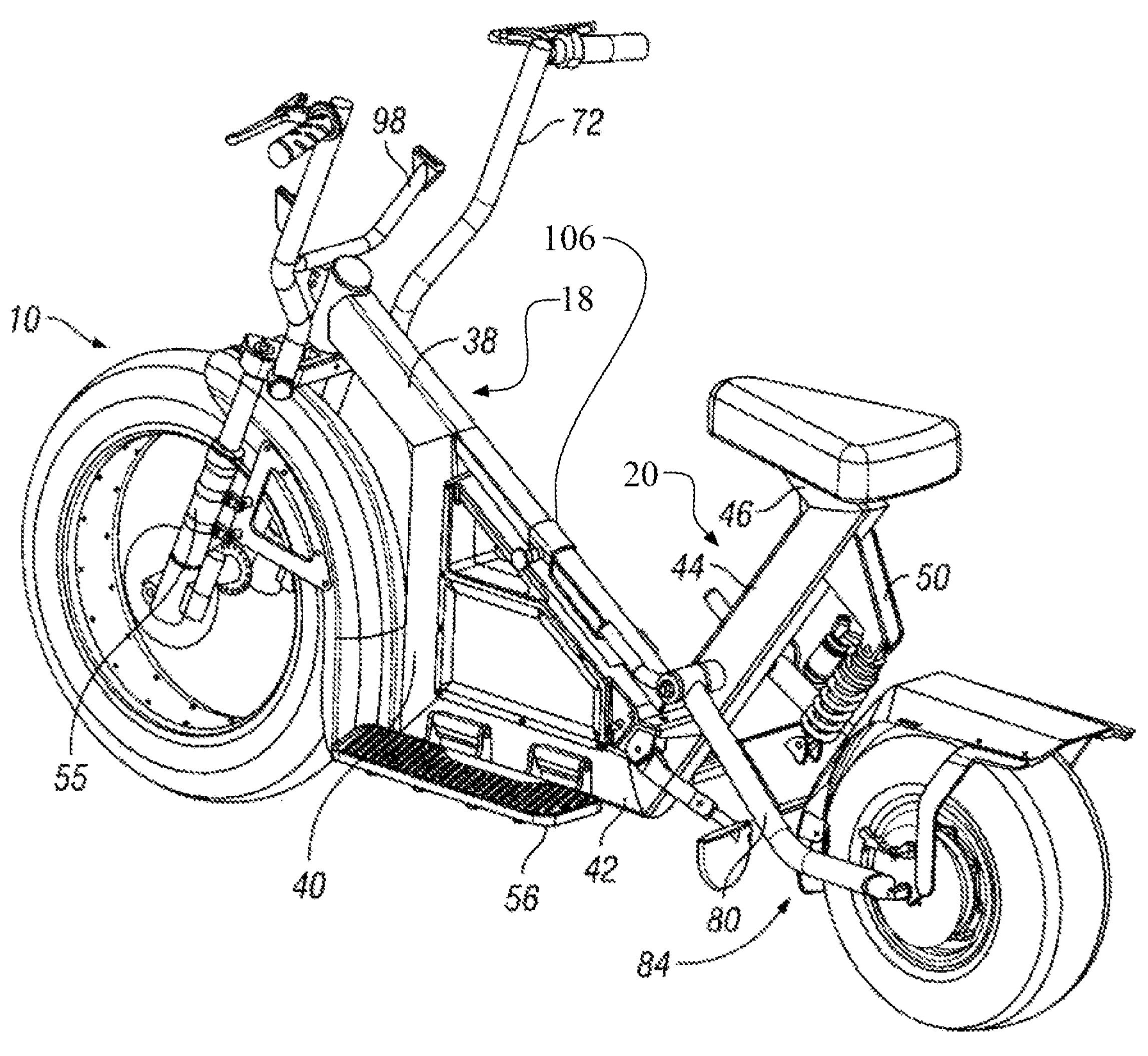
FIG. 4 is a top rear left side perspective view of the present invention, shown without a golf bag.

The rear wheel subassembly 24 includes a rear fork 78 including a pair of rear fork arms 80 pivotally attached at proximal ends to the rear segment 44 of the frame sba 18 and extending downward and rearward therefrom. At least one of the rear fork arms 80 attaches to the shock absorber 55 by a connector 82 (see FIG. 2). A distal fork portion 84 of each rear fork 78 supports a rear wheel 86 on a rear axle 88. The rear wheel 86 is much smaller in diameter than the front wheel 66 and supports a rear tire 90. The rear tire 90 is wider than the front tire 70 to provide good driving traction while minimizing impact on the turf of the course. The rear tire 90 may be inflatable or solid. A rear fender 92 attached to the rear fork arms 80 and over the upper portion of the rear tire 90. An optional basket 94 may be mounted on top of the fender 92 to facilitate storage of the rider's possessions and accessories during use.

The bag support sba 26 is adapted to hold the golf bag 12 in place on the cart/cycle 10. The golf bag 12 is supported at about a sixty degree vertical angle (thirty degree horizontal) with the club heads extending forward through the handlebars 72 and above the front wheel 66. The base of the golf bag 12 rests against the rear segment 44 and upon a pair of bag bottom rods 96 which extend forward from the rear segment 44 to hold the bag bottom up and laterally in place. The bag bottom rods 96 serve as a cradle for the bag bottom. An upper bag cradle 98 is mounted on the steering bracket 34 to laterally cradle the upper part of the golf bag 12 and prevent the bag and clubs from interfering with the handle bars 72. The upper bag cradle 98 is mounted on the frame 18 in such a manner that it is stationary with respect to the handlebars 72 and such that the golf bag 12 is maintained to be centered on the longitudinal plane 16 when the cart/cycle/cycle 10 is steered.

The motive/control sba 28 provides the power to move the cart/cycle 10 and the golfer 13 around the course. The presently preferred embodiments 10 and 118 utilize a rear wheel drive system with an electrical motor 100 and a rechargeable battery 102. The electrical motor 98 is ordinarily a disc motor situated in the hub of the rear wheel 86, but may drive the rear wheel by any of a variety of mechanisms, including a chain drive, or a belt drive. The battery 102 may be mounted at various locations on the cycle frame 18 but the preferred location, illustrated in the drawings, is within a battery cradle 104 mounted on the base segment 42. A removable or hinged retaining bar 106 vertically restrains the battery 102 while facilitating easy removability for recharging.

In the preferred embodiment 10 the electrical motor 100 is powerful enough to propel the cart/cycle 10, the rider 13, and the golf bag 12 and contents around a golf course. For this reason it has to have enough power to climb steep hills and otherwise negotiate difficult terrain. In order to accomplish these purposes the motor 100 may have more power than is considered to be "street legal" in many jurisdictions. For these reasons the present embodiment of the cart/cycle 10 is not intended for use except on golf courses or private property.

The speed of the motor 100 (including "off" and "idle" will typically be regulated by the golfer by a control unit 108 usually mounted on one of the handlebars 72 adjacent to the handle grips 76. A brake actuator 110, also typically situated near a handle grip 74, will control a brake applied to one or both of the front wheel 66 and the rear wheel 86. The front brake 114 will typically be a conventional friction brake while a rear brake 116 may be a motor brake, a disc brake, or a friction brake.

Figure 10:
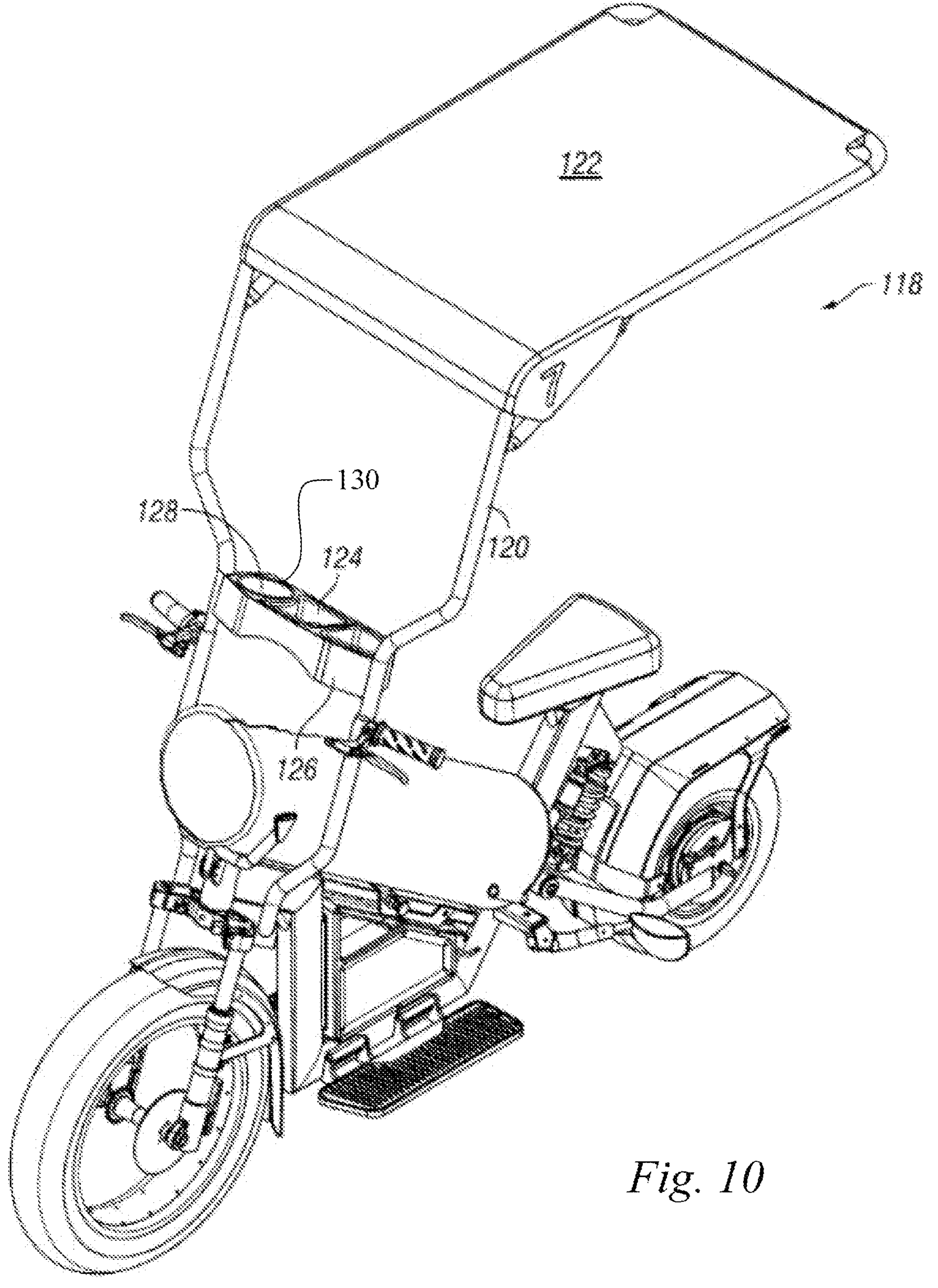
FIG. 10 is a front left perspective view of an alternate preferred embodiment of the invention.
Figure 11:
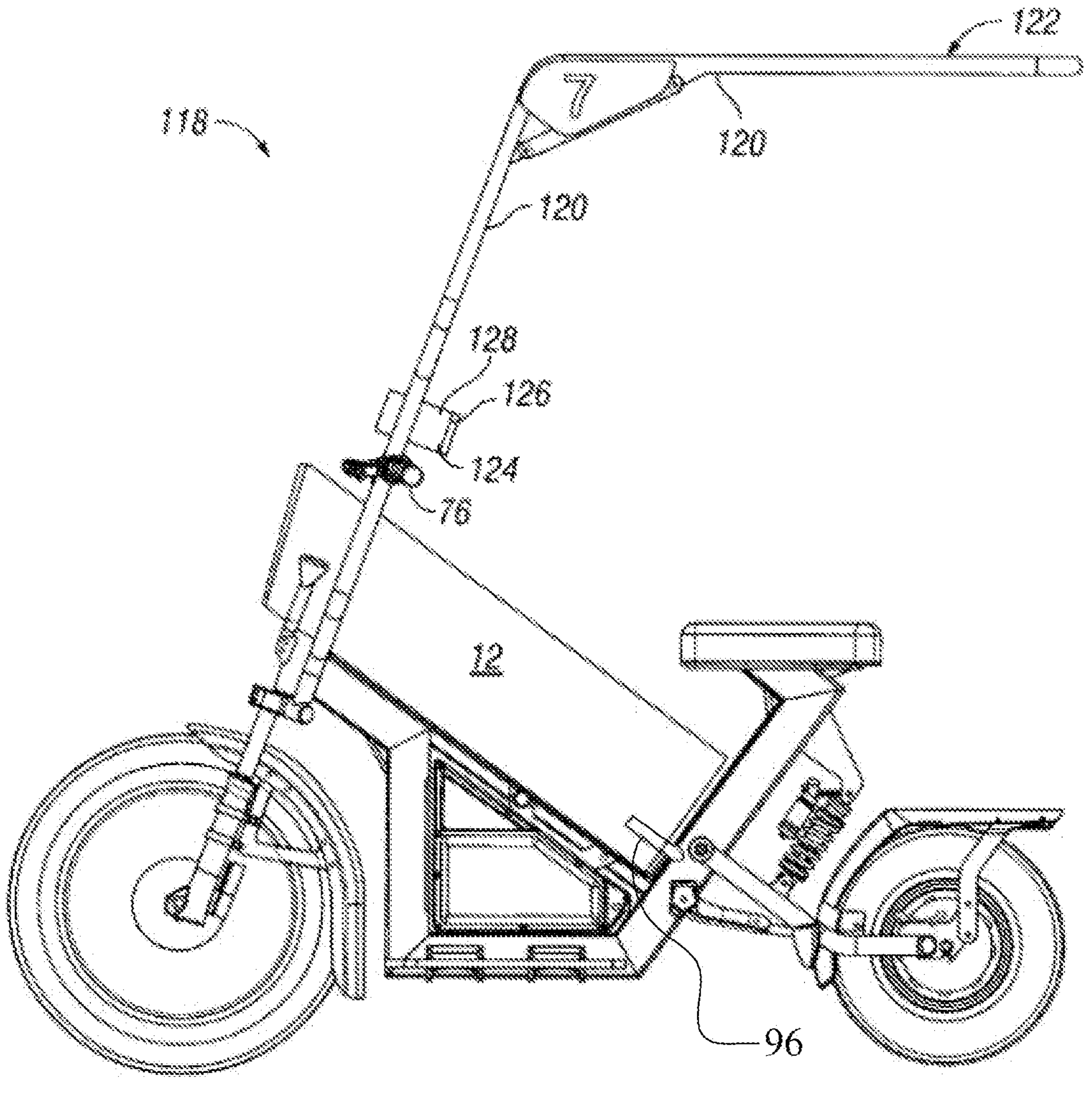
FIG. 11 is a right elevational view of the alternate embodiment.

An alternate embodiment 118 is illustrated in FIGS. 10 and 11. This is basically an enhancement to the previously described invention and includes several components which increase rider comfort and enhanced utilities. All of the overlapping features of the enhanced embodiment 118 are essentially the same as the preferred embodiment 10 except as described below.

The alternate embodiment 118 includes a detachable canopy frame 120 which mounts on the handlebars 72 on both sides inward of the handle grips 76. The canopy frame 120 upward and angles slightly rearward until it is significantly above the head of seated rider 13 and then bends rearward above the rider 13 to support a canopy 122 adapted to provide shade and some rain protection. The canopy frame 120 is relatively rigid and strong while the canopy 122 itself is typically an opaque fabric. It is noted that there is no extension providing rear support to the canopy frame 120 such that minimal impediment to the mounting and dismounting of the rider 13 occurs. Also, the canopy frame 120 and canopy 122 structure are optimized such that does not significant catch the wind and to minimally impact handling.

The canopy frame 120 also supports a console 124 which extends across the canopy frame 120 above the golf bag 12 and at approximately eye level to the rider 13. The console 124 is adjustable to facilitate loading the golf bag 12, either by sliding upward from its normal location of by pivoting out of the way so that it is easy to install and remove the golf bag 12 from the upper bag cradle 98.

The console 124 provides a desired number of compartments 126 suitable for storing small items, holding a drink. The console 124 also supports a display screen 128 (typically touch screen) facing the rider such that GPS information may be utilized and also utilizes a login control 130. The login control function of the display requires the (typically rental) user to: review and acknowledge safe riding instructions; agree to all terms and conditions; and validate prepayment before the control unit 108 is activated to allow powered movement. This streamlines interactions with the pro shop and allows the user to go directly to an unused unit to begin the round, this can be especially desirable to golfers who prepay greens fees and have established tee times. In a personally owned unit, these login controls 130 may be minimized or modified. Further, personally owned units may have a motor restriction in order to be "street legal".

The preferred embodiments 10 and 118 are primarily constructed of cast anodized aluminum for light weight and durability. The wheels 66 and 86 are formed of lightweight structural plastic with cushioned traction surfaces and may either be provided with solid hubs or spoke hubs. In some embodiments rubberlike friction surfaces are also provided to the front tire 70 and the rear tire 90.

Many modifications to the above embodiment may be made without altering the nature of the invention. The dimensions and shapes of the components and the construction materials may be modified for particular circumstances or types of bags to be carried.

While various embodiments have been described above, it should be understood that they have been presented by way of example only, and not as limitations.

INDUSTRIAL APPLICABILITY

The rideable golf bag cart/cycle 10 (and 118) of the present invention is intended for use primarily by golfers who desire maximum convenience and safety while transporting a golf bag and a rider during a round of golf. It is expected that these units will be optimal for rental uses at golf courses. The cart/cycle 10 is relatively lightweight. Like any cycle having two wheels, the cart/cycle 10 does require balancing by the rider 13 when in motion and tip-prevention by the kickstand 60 when not attended. The general symmetry of the cart/cycle 10 substantially aids in keeping the unit balance. The cart/cycle 10 also typically requires no straps or other fasteners to retain and support the golf bag 12 (although these may be optionally utilized), thus minimizing the amount of loose or dangling components and reducing effort.

For typical use, the rideable golf bag cart/cycle 10 will be in a rest position (collapsed mode 30) with the motor 100 off and the kickstand 60 activated. The rider 13 (or a worker) will then slide the golf bag 12 bottom first to rest against and on the restraints defined by the rear segment 44 and the pair of bag bottom rods 96. The upper portion of the golf bag 12 will rest against the upper bag cradle 98 which will provide vertical support and at least some lateral restraint. The golf bag 12 will then rest at about a thirty degree angle from horizontal and golf clubs will extend forward and upward over the front wheel 66 for easy access. The rider 13 will then (if desired) rotate the running boards 56 to the horizontal position and will mount the cart/cycle 10 to sit upon the seat 52. The legs of the rider 13 will straddle the bottom extent of the golf bag 12 and extend downward to the running boards 56 in use.

In order to move forward, the seated rider 13 will activate the control unit 108 to start the electric motor 100 and to select the speed of rotation of the rear wheel 86 to drive the cart/cycle 10 forward at the desired speed (see above for specific additional instructions to the alternate embodiment 118) The brake actuator 110 will be used to activate either or both the front brake 112 and rear brake 116 to control speed and slow or stop the travel when needed (such as on downslopes or on reaching the destination location). The rider 13 will then dismount, activate the kickstand 60 (or lean the cycle 10 against an object such as a tree or bench), play the next stroke(s) and repeat the process to proceed to the next location.

When the round is over, the golfer simply: dismounts; activates the kickstand 60 (or parks in a designated spot which prevents tipping); and removes the golf bag 12 from the cart 10: and rotates the handlebars 72 and the running boards 56 to the collapsed mode 30 for storage or transport.

The extreme convenience, ease of operation, relative compactness, and light weight of the inventive cart/cycle 10 and enhanced embodiment 118 make it a joy to own and use and a desirable accessory for any golfer who wishes to traverse the course without carrying the weight of the bag. The wide and relatively soft front tire 70 and rear tire 90 minimize disruption of the turf on the course and facilitate access to the areas of the course upon which powered units are permitted.

For the above, and other, reasons, it is expected that the collapsible rideable golf bag cart/cycle 10 of the present invention will have widespread industrial applicability. Therefore, it is expected that the commercial utility of the present invention will be extensive and long lasting.

We claim:

1. A motor driven rideable golf cycle for transporting a rider and a golf bag, comprising:

- a cycle frame supporting a front wheel, a rear wheel aligned with the front wheel, and a seat substantially aligned with the front wheel and rear wheel, wherein the front wheel is larger in diameter than the rear wheel;
- a front axle joining the front wheel to a pair of opposed fork arms, the pair of opposed fork arms rotatably coupled to the cycle frame at a rotational connection point of a steering bracket, the pair of opposed fork arms rotatably coupled at a lower end of the steering bracket and extending downward from the rotational connection point of the steering bracket and away from the rear wheel such that the front axle is located forward of the steering bracket and defines a normal riding configuration mode, wherein the rotational connection point of the steering bracket is located at an elevation above the front wheel and the rotational connection point of the steering bracket is located at a front-back position that is forward of a rear edge of the front wheel and rearward of a front edge of the front wheel;
- a steering subassembly rotatably coupled to the cycle frame and configured to turn the front wheel, with the steering subassembly including a right handlebar and a left handlebar;
- an electric motor for driving the rear wheel, the electric motor being controlled by a control subassembly operated by the rider and powered by a battery; and
- a bag support subassembly adapted to support the golf bag and including a stationary bag top cradle located such that in the normal riding configuration mode a portion of the stationary bag top cradle is located vertically above a portion of the front wheel at a cradle elevation greater than an elevation of the seat, wherein a position and an orientation of the stationary bag top cradle does not change with the rotation of the steering subassembly, and in the normal riding configuration mode at least a portion of the stationary bag top cradle is located forward of the right handlebar and the left handlebar.

2. The motor driven rideable golf cycle of claim 1, wherein the right handlebar and the left handlebar are repositionable such that the motor driven rideable golf cycle is reconfigurable to a compact collapsed position with the right handlebar and the left handlebar rotated toward the rear wheel and below the elevation of the seat.

3. The motor driven rideable golf cycle of claim 1, wherein the rear wheel has a width greater than the front wheel, and the stationary bag top cradle is attached to the cycle frame.

4. The motor driven rideable golf cycle of claim 1, wherein a portion of the seat is located at a front-back position that is rearward of a front edge of the rear wheel, and the stationary bag top cradle is attached to the steering bracket.

5. The motor driven rideable golf cycle of claim 1, wherein the electric motor is located within a hub of the rear wheel, the fork arms attach to a fork bracket, and the fork bracket is rotatably coupled to the lower end of the steering bracket.

6. The motor driven rideable golf cycle of claim 5, wherein the battery is removably attached to the cycle frame, and the right handlebar and the left handlebar attach to the fork bracket at an elevation below the lower end of the steering bracket.

7. The motor driven rideable golf cycle of claim 1, wherein the battery is attached to the cycle frame rearward of the steering bracket and rearward of the rear edge of the front wheel, and the battery is aligned on a longitudinal plane with the rear wheel and the front wheel.

8. The motor driven rideable golf cycle of claim 1, further including a rear axle joining the rear wheel to a pair of rear fork arms pivotably attached to the cycle frame, a connector attached to each fork arm, a shock absorber bracket attached to the cycle frame below the seat, and a shock absorber attached to the connector and the shock absorber bracket.

9. A motor driven rideable golf cycle for transporting a rider and a golf bag, comprising:

a cycle frame supporting a front wheel, a rear wheel aligned with the front wheel, and a seat substantially aligned with the front wheel and rear wheel;

a front axle joining the front wheel to a pair of opposed fork arms, the pair of opposed fork arms rotatably coupled to the cycle frame at a rotational connection point of a steering bracket with the rotational connection point located at a lowest point of the steering bracket, the steering bracket is located at an elevation above the front wheel, the pair of opposed fork arms extending downward from the rotational connection point of the steering bracket and away from the rear wheel such that the front axle is located forward of the steering bracket and defines a normal riding configuration mode, wherein the rotational connection point of the steering bracket is located at an elevation above the front wheel and the rotational connection point of the steering bracket is located at a front-back position that is forward of a rear edge of the front wheel and rearward of a front edge of the front wheel;

a steering subassembly rotatably coupled to the cycle frame and configured to turn the front wheel, with the steering subassembly including a right handlebar and a left handlebar;

an electric motor for driving the rear wheel, the electric motor being controlled by a control subassembly operated by the rider and powered by a battery; and a bag support subassembly attached to the cycle frame and adapted to support the golf bag, wherein a position and an orientation of the bag support subassembly does not change with the rotation of the steering subassembly.

10. The motor driven rideable golf cycle of claim 9, wherein the bag support subassembly includes a bag top cradle attached to the cycle frame and located such that in the normal riding configuration mode a portion of the bag top cradle is located at a cradle elevation greater than an elevation of the seat.

11. The motor driven rideable golf cycle of claim 10, wherein in the normal riding configuration mode at least a portion of the bag top cradle is located forward of the right handlebar and the left handlebar, and a portion of the seat is located at a front-back position that is rearward of a front edge of the rear wheel.

12. The motor driven rideable golf cycle of claim 10, wherein the electric motor is located within a hub of the rear wheel, and the bag top cradle is attached to the steering bracket.

13. The motor driven rideable golf cycle of claim 10, wherein in the normal riding configuration mode a portion of the bag top cradle is located vertically above a portion of the front wheel.

14. The motor driven rideable golf cycle of claim 9, wherein the rear wheel has a width greater than the front wheel, the battery is attached to the cycle frame rearward of the steering bracket and rearward of the rear edge of the front wheel, and the battery is aligned on a longitudinal plane with the rear wheel and the front wheel.

15. The motor driven rideable golf cycle of claim 9, wherein the front wheel is larger in diameter than the rear wheel, the fork arms attach to a fork bracket, and the fork bracket is rotatably coupled to the lower end of the steering bracket.

16. A motor driven rideable golf cycle for transporting a rider and a golf bag, comprising:

a cycle frame supporting a front wheel, a rear wheel aligned with the front wheel, and a seat substantially aligned with the front wheel and rear wheel, wherein the front wheel is larger in diameter than the rear wheel, and the rear wheel has a width greater than the front wheel;

a front axle joining the front wheel to a pair of opposed fork arms, the pair of opposed fork arms rotatably coupled to the cycle frame at a rotational connection point of a steering bracket, the pair of opposed fork arms extending downward from the rotational connection point of the steering bracket and away from the rear wheel such that the front axle is located forward of the steering bracket and defines a normal riding configuration mode, wherein the rotational connection point of the steering bracket is located at a bottom end of the steering bracket and at an elevation above the front wheel and the rotational connection point of the steering bracket is located at a front-back position that is forward of a rear edge of the front wheel and rearward of a front edge of the front wheel;

a steering subassembly rotatably coupled to the cycle frame and configured to turn the front wheel, with the steering subassembly including a right handlebar and a left handlebar, wherein the right handlebar and the left handlebar are repositionable such that the motor driven rideable golf cycle is reconfigurable to a compact collapsed position with the right handlebar and the left handlebar rotated toward the rear wheel and below the elevation of the seat;

an electric motor for driving the rear wheel, the electric motor being controlled by a control subassembly operated by the rider and powered by a battery removably attached to the cycle frame and aligned on a longitudinal plane with the rear wheel and the front wheel; and a bag support subassembly adapted to support the golf bag and including a stationary bag top cradle located such that in the normal riding configuration mode a portion of the stationary bag top cradle is located vertically above a portion of the front wheel at a cradle elevation greater than an elevation of the seat, wherein a position and an orientation of the stationary bag top cradle does not change with the rotation of the steering subassembly, and in the normal riding configuration mode at least a portion of the stationary bag top cradle is located forward of the right handlebar and the left handlebar.

17. The motor driven rideable golf cycle of claim 16, wherein a portion of the seat is located at a front-back position that is rearward of a front edge of the rear wheel.

18. The motor driven rideable golf cycle of claim 17, wherein the electric motor is located within a hub of the rear wheel, and the battery is attached to the cycle frame rearward of the steering bracket.

19. The motor driven rideable golf cycle of claim 18, further including a running board attached to the cycle frame.

20. The motor driven rideable golf cycle of claim 19, wherein the running board extends under a portion of the battery, and further including a rear axle joining the rear wheel to a pair of rear fork arms pivotably attached to the cycle frame, a connector attached to each fork arm, a shock absorber bracket attached to the cycle frame below the seat, and a shock absorber attached to the connector and the shock absorber bracket.

* * * * *